United States Patent [19]

Sorge et al.

[11] Patent Number: 4,554,167
[45] Date of Patent: Nov. 19, 1985

[54] METHOD FOR AGGLOMERATING ASPARTAME AND ACID-CONTAINING MIXES

[75] Inventors: Richard M. Sorge, Lakewood; Ronald W. Ponzoni, Nutley; Myron D. Shoaf, Cranbury, all of N.J.

[73] Assignee: General Foods Corp., White Plains, N.Y.

[21] Appl. No.: 620,414

[22] Filed: Jun. 14, 1984

[51] Int. Cl.$^4$ .......................... A23L 1/236; A23L 2/00
[52] U.S. Cl. ..................................... 426/285; 426/548; 426/590; 426/453
[58] Field of Search ............... 426/285, 453, 520, 548, 426/590

[56] References Cited

U.S. PATENT DOCUMENTS

| | | | |
|---|---|---|---|
| 3,433,644 | 3/1969 | Ganske et al. | 426/548 |
| 3,615,670 | 10/1971 | Sienkiewicz et al. | 426/453 |
| 3,715,216 | 2/1973 | Wuhrmann | 426/285 |
| 3,928,633 | 12/1975 | Shoaf et al. | 426/96 |
| 4,394,395 | 7/1983 | Rostagno et al. | 426/453 |

Primary Examiner—Raymond Jones
Assistant Examiner—Elizabeth C. Weimar
Attorney, Agent, or Firm—Thomas R. Savoie; Barbara Toop D'Avanzo; Daniel J. Donovan

[57] ABSTRACT

The present invention provides a method for agglomerating a comestible mix without the addition of moisture. At least 30% of a food-acid chosen from the group consisting of anhydrous citric acid, malic acid and combinations thereof, and at least 3% aspartame is blended with other food approved materials like bulking agents, flavorants, colorants, starches or proteins. The blending is effected at an elevated temperature, the temperature being 140° to 200° F. The blending period is for a time effective to produce a desired agglomerate size. The product is cooled and then may be packaged for direct consumption. Agglomerates consisting of aspartame and the food acid can be made with as little as 0.5% aspartame.

12 Claims, No Drawings

METHOD FOR AGGLOMERATING ASPARTAME AND ACID-CONTAINING MIXES

BACKGROUND OF THE INVENTION

1. Technical Field

The present invention relates to a method for producing an agglomerated comestible mix which contains both aspartame and selected food acids. More particularly this invention relates to a method for agglomerating an aspartame-sweetened powdered drink mix.

Agglomerated comestible mixes have heretofore been prepared by either using a combination of moisture and moderate heat or using high heat such that one of the mix components actually melts. These techniques are usually practiced using either a continuous or batch-type fluidized bed agglomerator wherein finely divided particles are suspended in a fluidized bed and are then exposed to a sufficient amount of either moisture and/or heat to effect the formation of properly-sized agglomerates. Another method is to spread the mix to be agglomerated over a tray or belt and then to supply moisture and/or heat to the static bed in order to form a fused sheet. Such a fused sheet would then be broken up and screened in order to obtain a desired particle size.

2. Prior Art

Fluidized bed agglomeration procedures, such as disclosed in U.S. Pat. Nos. 3,251,695 to Gidlow, 3,433,644 to Ganske and 2,856,290 to Peebles, are well-known in the art. These patents rely on an aqueous agglomeration vehicle which is sprayed into the fluidized bed in order to induce agglomeration. After sufficient agglomeration has been effected, significant amounts of heat must be supplied to the agglomerates to drive off exogenous moisture. Such procedures as using added moisture and high temperatures possess certain disadvantages such as exposing water-sensitive ingredients to moisture, exposing heat-sensitive ingredients to elevated temperatures and increased energy costs for having to first add then remove moisture.

The use of elevated temperatures to form a fused mass or sheet from an aspartame and acid-containing dry blend is disclosed in U.S. Pat. No. 3,928,633 to Shoaf et al. According to this patent a citric acid melt is formed and this melt is subsequently cooled and ground.

The use of the water of crystallization in crystalline hydrates such as citric acid monohydrate which is released upon heating to effect a limited amount of agglomeration is disclosed in U.S. Pat. No. 3,715,216 to Wuhrmann et al.

There is, therefore, a need to provide an agglomeration process that avoids the need for either aqueous agglomeration vehicle or elevated (i.e., melting) temperatures. This need is especially desirable for agglomerating aspartame and acid-containing mixes since aspartame is a compound which is subject to decomposition in an aqueous acid environment. It would also be desirable to provide a method for agglomerating an aspartame and acid-containing mixture wherein mixing and agglomeration can be efficiently and economically done in the same equipment.

SUMMARY OF THE INVENTION

The present invention provides a process for agglomerating comestible mixes, such as powdered soft drink mixes, which contain aspartame and selected food acids. This process proceeds in the absence of traditional agglomeration techniques such as the introduction of aqueous agglomeration vehicles or the use of temperatures which are above the melting points of one or more of the mix ingredients.

The process of the present invention also results in an aspartame-containing mixture which has excellent flowability and water-dispersibility as compared to mixtures wherein aspartame is merely dry blended with the other mix ingredients. It is well-known in the art that aspartame, because of its rod-shaped particle or crystal configuration and its tendency to clump both in the dry blend and when added to water create significant problems both in processing and product functionality.

According to the present invention, a dry mix containing at least 0.5% by weight of aspartame, the dipeptide sweetener L-aspartyl-L-phenylalanine methyl ester, and at least about 30% of a food acid selected from the group consisting of anhydrous citric acid, malic acid or combinations thereof is prepared by blending the ingredients. Other functional ingredients such as flavors, colors, clouding agents, buffer agents, juice solids, tea solids and the like may be included in the dry blend in order to produce an agglomerated, soluble food powder which will, upon reconstitution with an aqueous fluid, produce a desirable foodstuff. The dry blend is heated to a temperature of between 140° F. and 200° F., preferably between 140° F. and 185° F., and most preferably between 140° F. and 165° F. for a sufficient period of time to effect agglomeration of the blend and the agglomerated blend is then cooled.

The process may be effected in either a batch or continuous operation. Preferably the heating and cooling steps are conducted while the blend and agglomerate are in an agitated state; however, heating and cooling may also be effected on a static bed yielding an agglomerated mass which must be ground and sieved. Agglomeration is effected without the use of a gaseous steam which would produce a fluidized bed.

Fluidized bed agglomeration is a well-known technique; however, it is also known that this technique leads to measurable losses in terms of product recovery. Since aspartame is an extremely expensive ingredient, it is economically important to reduce product loss to the lowest possible level. Since the present agglomeration process can be effected in a closed agitated system or in a static state, both without the circulation of any fluidizing gas, losses will be essentially zero.

It has been found that the size of the agglomerates produced when agitation is employed during the heating step is a function of the maximum temperature the blend achieves, the amount of time the blend remains at elevated temperatures above 140° F., and the amount of agitation to which the blend is subjected during heating and cooling. One skilled in the art will be readily able to determine operable conditions for agglomerating compositions within the scope of this invention using avaliabe and commercial food processing equipment. According to a preferred embodiment of this invention, blending and agglomeration of this mix is effected in a single jacketed blender, such as a V-type blender.

DESCRIPTION OF THE INVENTION

According to the present invention production of an agglomerated soluble food product is effected by: (1) blending on a weight basis at least 0.5% aspartame, at least about 30% anhydrous citric acid, malic acid or combination thereof and other functional powdered or dry food ingredients which neither melt nor release water of crystallization during a subsequent heating step; (2) heating the blend to a temperature between 140° and 200° F. for a sufficient period of time to effect agglomeration; and (3) cooling the agglomerated blend to a temperature below 140° F.

As one can see from the steps set out above, the present agglomeration process proceeds in the absence of added moisture. The process also appears to be effective in the absence of any availabe water since it has been found that agglomeration may be effected using thoroughly desiccated ingredients. Low levels of moisture contained in one or more of the mix ingredients are, however, desirable in that agglomeration will take place at a lower temperature than when all dehyrated ingredients are agglomerated. Additionally the costs of dehydrating ingredients which, as commercially-available, will contain a modest, typically below 10%, moisture content is avoided.

The available moisture content of the blend to be agglomerated will typically be below 8% by weight, more typically below 6% by weight and most typically below 3% by weight. Excluded from the value of available moisture is moisture, such as the water of crystallization present in any potassium citrate component, which would not be released or liberated during the heating step. For instance potassium citrate releases its water of crystallization at 180° C. (356° F.), well above agglomeration process of this invention.

The exact mechanism that is responsibe for effecting agglomeration in accordance with this invention is not completely understood. It is postulated, however, that direct contact between the aspartame and the acid at a temperature of about 140° F. or higher creates a sticky surface that not only will fuse aspartame particles to acid particles but will also act to glue other blend ingredients to these sticky surfaces.

Typically when essentially the entire formulation of a soluble food powder, such as a powdered beverage mix, is to be agglomerated the formulation will contain at least about 3% by weight of aspartame so that the product wil be adequately agglomerated, and will possess the requisite sweetness. If it is desired, however, to merely produce a highly-functional ingredient consisting of aspartame and a food acid which ingredient may be subsequently used, such as as by dry-blending, with other dry ingredients, the amount of aspartame may be as low as 0.5% by weight of the agglomerate.

The composition of the blend is critical to the agglomeration process of this invention. Combinations of dehydrated aspartame together with dehydrated anhydrous citric and/or malic acid readily agglomerate at temperatures within the scope of this invention. Comparable attempts to agglomerate dehydrated anhydrous citric acid with other dehydrated components were not successful. For purposes of this evaluation dehydration was effected by oven drying at 70° C. for at least 24% hours under a vacuum of about 22 inches of Hg.

An investigation to establish the criticality of aspartame was conducted by blending 143.2 grams of dehydrated, anhydrous citric acid and 8.78 grams of a dehydrated variant component. The blend was placed in a sealed cylindrical jar which was continuously rotated about its cylindrical axis as heat was being supplied to the jar surface by means of a hot air gun. The results of this investigation are set forth in Table 1 below.

TABLE 1

| Variant | Jar Surface Temp (°F.) | Maximum Blend Temp. (°F.) | Heating Time (min) | Results |
|---|---|---|---|---|
| Pregelatinized starch (Cleargel ®) | 185–195 | 193 | 45 | no agglomeration |
| Non-Fat Milk Solids | 190–199 | 198 | 60 | no agglomeration |
| Aspartame | 190 | 175 | 25 | agglomerate formed |
| Sucrose | 190–195 | 197 | 60 | no agglomeration |

An investigation was also conducted to determine the efficacy of various food acids in the process of this invention. In this investigation 1-gram of aspartame was blended with 24 grams of various acids. The blends were placed in glass jars which were sealed and placed in a 180° F. oven for two hours, during which time the jars were rotated. Anhydrous citric and malic acids yielded desirable agglomeration. Tataric acid and adipic acid yielded less desirable agglomeration and succinic acid and fumaric acid did not produce agglomeration.

The comestible blends to be agglomerated in accordance with this invention must contain on a weight basis at least 0.5%, aspartame and also include at least about 30%, preferably at least about 50% of anhydrous citric and/or malic acids. For agglomerated beverage mixes produced in accordance with this invention the blends will contain at least 3%, preferably at least 4% aspartame and may contain buffering agents up to about 10%, gums up to about 3%, juice solids up to about 10%, tea solids up to about 40% and functional levels of various flavors, flavor enhancer and colors.

Blending of the ingredients may proceed in any manner known to those skilled in the art.

Heating of the bend is carried out at a temperature of from 140° F. to below 200° F., preferably below 180° F. and most preferably below 165° F. It is during this heating step that an interaction between the aspartame and the selected food acid occurs such that agglomeration is effected.

The heating may be applied to a static bed of the blend. The bed may be of the continuous type such as being carried on an endless belt through a heating zone or be of finite dimensions and carried on a tray into and out of a heating zone. This static bed technique would yield a sheet-like agglomerate which would then be comminuted and screened to a desired particle size. Usually the comminuted material will be combined with a flow agent such as magnesium oxide, tricalcium phosphate, silicates and the like in an amount up to about 10% by weight of the agglomerate.

Preferably, the bed is agitated during the heating step. The use of a jacketed, closed blender such that a heating or cooling fluid may be passed through the jacket and the blender can be rotated without discharging either blend or agglomerate, is highly suitable. A V-Blender, such as manufactured by Patterson-Kelly Corp. of East Strousburg, Pa., is such a commercially-available blender. It would also be possible to utilize an open blender wherein the blend would be subjected to a less vigorous degree of agitation. The agglomerate particles produced from the agitated bed technique are of a relatively uniform size and compositional consistency.

The agglomerate size is directly related to the heating period and also the temperature of the blend. The greater the period during which the blend is above 140° F. and the higher the temperature between 140° F. and 200° F. reached by the blend, the larger the agglomerate. It should be recognized that the temperature recited in this description is the temperature of the blend itself and not of the heating fluid being circulated in the jacketed vessel or of the walls of the vessel.

In operation the cooling of the agglomerate should be conducted at a relatively rapid rate such that agglomeration can be brought to a desired end point and then terminated. In the agitated bed technique it has been found useful to add up to about 10% of a flow agent into the hot agitated bed as the cooling step is commenced. In this manner the unheated flow agent serves to prevent further agglomeration of the ingredients although at least a portion of the flow agent may become part of the agglomerates. Cooling in a jacketed blender would be done by circulating a cooling fluid in the jacket. Other cooling techniques such as cool, low-moisture air or a cooled heat transfer surface may also be used.

This invention is further described but not limited to the Examples set forth below.

EXAMPLE 1

A lemonade-flavored beverage mix is manufactured in accordance with this invention. To a jacketed V-Blender TM having 130° F. fluid circulating in the jacket was added on a parts by weight basis 71.9 parts anhydrous citric acid, 7.9 parts potassium citrate, 4.4 parts aspartame, 2.9 parts 10 D.E. dextrin, 0.3 parts vitamin C, 1.5 parts clouding agent, 8.11 parts flavors and colors and 1.8 parts dried juice solids. The blender was rotated at 6 rpm's and when the blend reached a temperature of 90° F., the temperature of the circulating heating fluid was raised to 180° F. After about 50 minutes the blend had reached a temperature between 150° to 155° F. and was found to be uniformly agglomerated. At this point, 2.0 parts of magnesium oxide was added to the blend and the circulating fluid temperature was lowered to about 55° F. Blender rotation was continued until the agglomerated blend cooled to about 110° F. at which point the blender was discharged. The discharged blend which is characterized as free-flowing and having a uniform granular appearance was then packaged in moisture-proof containers. The packaged beverage mix remained free-flowing after several weeks of storage.

It should be noted that the removal of aspartame from the formula of Example 1 results in the absence of agglomeration in the blend.

EXAMPLE 2

Twenty-five grams of a punch-flavored beverage mix was added to an open glass jar to produce a layer of ¾ to 1 inch deep. The mix consisted of separate ingredients which had been dry blended and on a parts by weight basis contained 59.6 parts anhydrous citric acid, 10 parts potassium citrate, 7.1 parts aspartame, 0.53 parts vitamin C, 10.9 parts color and flavor and 4.8 parts of 10 D.E. dextrin. The jar was placed in a thermostatically-controlled convection oven which cycled between 160° and 180° F. Agglomeration was observed to proceed from the bottom up and after one hour all but the top surface of the mix had agglomerated into a single mass. The agglomerated mass was pressed through a No. 8 mesh U.S.S. Sieve to produce sized agglomerated particles which were readily dispersible and soluble in cold water.

What is claimed is:

1. A method for producing a stable, freeflowing agglomerate of aspartame and a food acid comprising the steps of:
    (a) blending at least about 0.5% by weight aspartame and at least 30% by weight of a food acid selected from the group consisting of anhydrous citric acid, malic acid and combinations thereof, said blend being free of ingredients which melt at or below 200° F. and said blend having an available moisture content of below 8% by weight;
    (b) applying heat to the blend to raise the blend temperature to between 140° and 200° F. and maintaining the blend temperature within said range for a period of time effective to agglomerate the blend without the addition of added moisture; and
    (c) cooling the agglomerated blend.

2. The method of claim 1 wherein the blend is continuously agitated during heating step (b).

3. The method of claim 2 wherein the agglomerated blend is agitated during the cooling step (c).

4. The method of claim 3 wherein flow agent, is added to the agglomerated blend before the blend is cooled.

5. The method of claim 4 wherein the flow agent is magnesium oxide or tricalcium phosphate.

6. The method of claim 1 wherein the blend constitutes a beverage mix and contains at least 3% aspartame, a flavor agent and a color agent.

7. The method of claim 1 wherein the blend is heated to between 140° and 185° F.

8. The method of claim 1 wherein the blend is heated to between 140° and 165° F.

9. The method of claim 1 wherein the available moisture content of the blend is below 6% by weight.

10. The method of claim 1 wherein the available moisture content of the blend is below 3% by weight.

11. The method of claim 1 wherein the blend of step (a) contains at least 50% by weight of the food acid.

12. The method of claim 11 wherein the blend contains at least 3% by weight aspartame.

* * * * *